US009063783B2

(12) United States Patent
Drepper

(10) Patent No.: US 9,063,783 B2
(45) Date of Patent: Jun. 23, 2015

(54) COORDINATING PARALLEL EXECUTION OF PROCESSES USING AGENTS

(75) Inventor: Ulrich Drepper, Los Gatos, CA (US)

(73) Assignee: Red Hat, Inc., Raleigh, NC (US)

(*) Notice: Subject to any disclaimer, the term of this patent is extended or adjusted under 35 U.S.C. 154(b) by 1502 days.

(21) Appl. No.: 12/276,864

(22) Filed: Nov. 24, 2008

(65) Prior Publication Data

US 2010/0131956 A1     May 27, 2010

(51) Int. Cl.
*G06F 9/50*     (2006.01)

(52) U.S. Cl.
CPC ........ *G06F 9/5011* (2013.01); *G06F 2209/503* (2013.01)

(58) Field of Classification Search
CPC ....................................................... G06F 21/00
See application file for complete search history.

(56) References Cited

U.S. PATENT DOCUMENTS

| 6,925,642 | B1* | 8/2005 | Commander ................. 718/104 |
| 7,665,090 | B1* | 2/2010 | Tormasov et al. ........... 718/104 |
| 2007/0256127 | A1* | 11/2007 | Kraemer et al. ................ 726/23 |
| 2008/0016236 | A1* | 1/2008 | Beverly et al. ................ 709/230 |
| 2009/0282477 | A1* | 11/2009 | Chen et al. ..................... 726/22 |
| 2009/0320037 | A1* | 12/2009 | Gokhale et al. ............... 718/104 |

* cited by examiner

*Primary Examiner* — Eric C Wai
(74) *Attorney, Agent, or Firm* — Lowenstein Sandler LLP

(57) ABSTRACT

Methods and systems for managing program-level parallelism in a multi-core processor environment are provided. The methods for managing parallel execution of processes associated with computer programs include providing an agent process in an application space, which is operatively coupled to an operating system having a kernel configured to determine processor configuration information. The application space may be a runtime environment or a user space of the operating system, and has a lower privilege level than the kernel. The agent process retrieves the processor configuration information from the kernel, and after receiving a request for the processor configuration information from application processes running in the application space, the agent process provides a response to the requesting application process. The agent process may also generate resource availability data based on the processor configuration information, and the application processes may initiate a thread based on the resource availability data.

20 Claims, 4 Drawing Sheets

COORDINATING PARALLEL EXECUTION OF PROCESSES USING AGENTS

FIELD

The present teachings relate generally to systems and methods for managing program-level parallelism, and more particularly to platforms and techniques for supporting and coordinating parallel execution of processes associated with computer programs in a system that has multiple processor cores.

BACKGROUND

Modern computer systems are increasingly employing multiple processor cores to satisfy the ever-greater demand for more computing power and capability, by incorporating one or more processors that each contains two or more "execution cores," or computational engines, within the processor. A multi-core system can outperform a traditional single core system at similar clock rates because it can distribute work over multiple execution cores. Thus, a multi-core system is capable of performing more work within a given clock cycle, while avoiding issues that affect single core systems caused by limits in transistor design, power consumption, and heat generation.

A multi-core system is capable of multiprocessing, or concurrently executing separate threads of code, because the execution cores in the multi-core system can run software programs as discrete processors with all the associated execution resources. For example, the multi-core system can concurrently support a first thread running inside a process associated with a program and a second thread running from an operating system, or multiple threads running inside a single process. Multimedia and Web server applications are especially conducive to multiprocessing because many of their operations can run in parallel.

However, programs running on a multi-core system must be specifically designed to spread its workload across multiple execution cores to utilize the additional capabilities offered by the multi-core system. This functionality is called thread-level parallelism or "threading." Applications, runtime environments (e.g., Java™ Runtime Environment by Sun Microsystems, Common Runtime Library by Microsoft Corp., and the like), and operating systems (e.g., Linux™, UNIX™, Open VMS™, Windows™ by Microsoft Corp., Sun Solaris™ by Sun Microsystems, Mac OS™ by Apple Computer, AIX™ by IBM, and the like) that are designed to support such functionality are referred to as "threaded" or "multi-threaded." Unfortunately, designing programs that can take full advantage of multi-core system architectures and associated multi-threaded environments can be a difficult development challenge.

Typically, software developers adhere to an explicit threading model and thus develop multi-threaded programs that, during runtime, explicitly initiate threads and control the life-cycle of those threads. Software developers, however, face the challenge of developing programs that can create a sufficient number of threads to optimally utilize available execution cores and other resources without creating too many threads, which would cause expensive rescheduling and context switches. Moreover, programs developed using the explicit threading model can not properly scale to changes in the multi-core system architectures. Programs developed using explicit threading model in addition can not dynamically adjust to the workload of execution cores in a multi-core system, and can not dynamically coordinate allocation of the execution cores with other programs running on the multi-core system.

Attempts to overcome shortcomings of existing threading models include having a program and its processes determine available execution cores and other resources of the multi-core system prior to creating new threads, in order to avoid over-utilization of available resources. However, these attempts fall short because the program and its processes do not know the resource demands and requirements of other programs running in the system, and thus the program and its processes cannot coordinate resource allocation with the other programs. Furthermore, determining available execution cores and other resources typically require computationally expensive operations, such as system calls, which results in unnecessary and unacceptable performance penalty when multiple programs and their processes running in the multi-core system each attempts to determine available resources prior to creating new threads.

Therefore, there is a need to overcome these and other problems in the art to provide methods and systems for supporting and coordinating parallel execution of programs and processes associated with the programs between multiple execution cores in a multi-core system.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
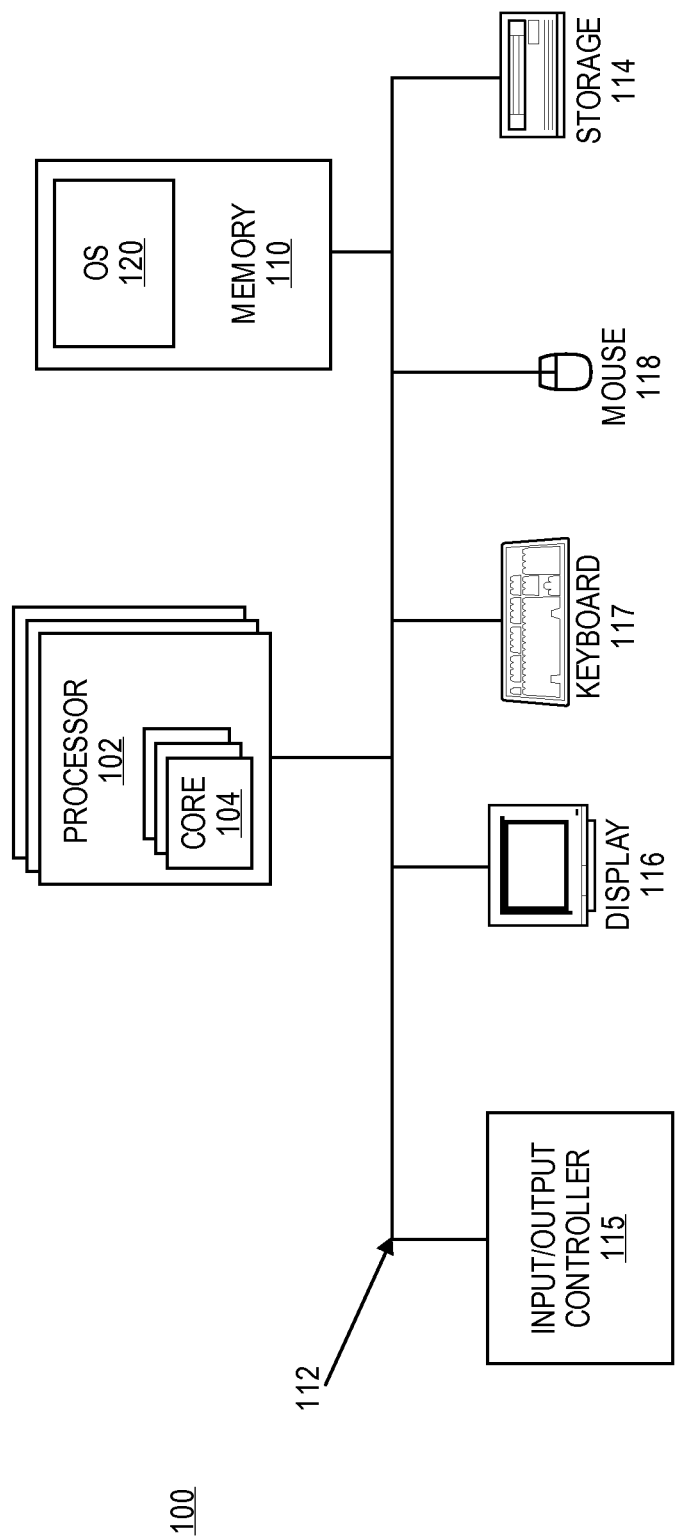
FIG. 1 illustrates a computer system that is consistent with embodiments of the present teachings.

According to the present teachings in one or more aspects, methods and systems that manage parallel execution of processes in a multi-core processor environment are provided. In a general implementation of the present teachings, an agent process is provided in an application space operatively coupled to an operating system that has a kernel, to retrieve processor configuration information of the processor environment from the kernel and to respond to requests for the processor configuration information and/or system resources from application processes running in the application space.

Various embodiments of the present teachings provide methods and systems that manage parallel execution of processes in a multi-core processor environment by providing an agent process in an application space, which is operatively coupled to an operating system that has a kernel configured to determine processor configuration information. The application space may be a runtime environment or a user space of the operating system, and has a lower privilege level than the kernel. In some embodiments, the agent process retrieves the processor configuration information from the kernel, and after receiving a request for the processor configuration information from one of a plurality of application processes running in the application space, the agent process provides a response to the information request to the requesting application process. In further embodiments, the agent process may generate resource availability data based on the processor configuration information, and the application processes may initiate a thread of execution, a fiber, or other type of execution context based on the resource availability data. The agent process may provide the processor configuration information and the resource availability data to the application processes using an inter-process communication protocol, and thus reducing the number of system calls to the underlying kernel by the application processes.

Various embodiments of the present teachings provide methods and systems that coordinate parallel execution of processes in a multi-core processor environment by providing an agent process in an application space, which is operatively coupled to an operating system that has a kernel configured to determine processor configuration information and a system workload. The application space may be a runtime environment or a user space of the operating system, and has a lower privilege level than the kernel. In some embodiments, the agent process retrieves the processor configuration information and the system workload from the kernel, and generates resource availability data based on the processor configuration information and the system workload. After receiving a resource request from one of a plurality of application processes running in the application space, the agent process allocates resources to the requesting application process based on the resource request and the resource availability data. The agent process can, for example, perform load balancing by assigning one execution core to the requesting application process. In further embodiments, the agent process may allocate resources or deny resource requests based on, for example, the resource availability data, attributes of the requesting process and other application processes, system resources currently allocated to the requesting process or the other application processes, and/or pending resource requests from the requesting process or the other application processes. Because the agent process obtains a system-wide view of the system requirements and resource utilization of the application processes and their associated execution contexts running in the application space, the agent process may coordinate resource allocation to the application processes based on the system-wide view.

Reference will now be made in detail to exemplary embodiments of the present teachings, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which may be practiced. These embodiments are described in sufficient detail to enable those skilled in the art to practice these embodiments and it is to be understood that other embodiments may be utilized and that changes may be made without departing from the scope of the present teachings. The following description is, therefore, merely exemplary.

FIG. 1 illustrates a computer system 100 that is consistent with embodiments of the present teachings. In general, embodiments of the present teachings may be implemented in various computer systems, such as a personal computer, a server, a workstation, an embedded system, or a combination thereof. However, for purposes of explanation, system 100 is shown as a general purpose computer that is well known to those skilled in the art. Examples of the components that may be included in system 100 will now be described.

As shown, system 100 may include at least one processor 102, a keyboard 117, a pointing device 118 (e.g., a mouse, a touchpad, and the like), a display 116, main memory 110, an input/output controller 115, and a storage device 114. System 100 may also be provided with additional input/output devices, such as a printer (not shown). The various components of system 100 communicate through a system bus 112 or similar architecture. In addition, system 100 may include an operating system (OS) 120 that resides in memory 110 during operation.

Processor 102 may be a multi-core processor, and therefore may include two or more execution cores (e.g., an execution core 104) or engines. An execution core 104 is any part of processor 102 that performs the operations and calculations called for by a running process. Execution core 104 may have its own internal control sequence unit, a set of registers to describe the state of the execution, and other internal units to implement its functions. For example, execution core 104 may have its own bus manager and memory interface, and other components to perform calculations.

In order to coordinate the operation of its processing cores, processor 102 may provide various features. For example, processor 102 may provide instructions which enable OS 120 to implement various synchronization primitives, such as a semaphore or machine instruction, that coordinate the operation of execution core 104. Some processors, like those made by Intel Corporation, provide hardware support for context switches and synchronization. Alternatively, synchronization may be performed at the software level using services of OS 120 and sharing data in memory 110.

Multi-core processors are well known to those skilled in the art. For example, processor manufacturers such as IBM, Advanced Micro Devices, Sun Microsystems, and Intel Corporation, offer multi-core processors that each includes multiple execution cores. Indeed, processors of up to 96 cores, such as those from ClearSpeed, are known to those skilled in the art. Any number of execution cores (e.g., execution core 104) in processor 102 can be utilized in embodiments of the present teachings.

In addition, one skilled in the art will recognize that system 100 may include multiple processors 102. For example, system 100 may include multiple copies of the same processor. Alternatively, system 100 may include a heterogeneous mix of various types of processors. For example, system 100 may use one processor as a primary processor and other processors as co-processors. For another example, system 100 may include one or more multi-core processors and one or more single core processors. Thus, system 100 may include any number of execution cores (e.g., execution core 104) across a set of processors (e.g., processor 102).

As to keyboard 117, pointing device 118, and display 116, these components may be implemented using components that are well known to those skilled in the art. One skilled in the art will also recognize that other components and peripherals may be included in system 100.

Main memory 110 serves as a primary storage area of system 100 and holds data that is actively used by applications running on processor 102. One skilled in the art will recognize that applications are software programs that each contains a set of computer instructions for instructing system 100 to perform a set of specific tasks, and that the term "applications" may be used interchangeably with application software, application programs, and/or programs in accordance with embodiments of the present teachings. Memory 110 may be implemented as a random access memory or other form of memory, which are well known to those skilled in the art.

OS 120 is an integrated collection of routines and instructions that are responsible for the direct control and management of hardware in system 100 and system operations. Additionally, OS 120 provides a foundation upon which to run application software. For example, OS 120 may perform services, such as resource allocation, scheduling, input/output control, and memory management. OS 120 may be predominantly software, but may also contain partial or complete hardware implementations and firmware. Well known examples of operating systems that are consistent with the principles of the present teachings include Linux™, Mac OS™ by Apple Computer, Solaris™ by Sun Microsystems, Windows™ (e.g., Windows CE™, Windows NT™, Windows 2000™, Windows XP™, and Windows Vista™) by Microsoft Corporation, Open VMS™, and AIX™ by IBM.

Figure 2:
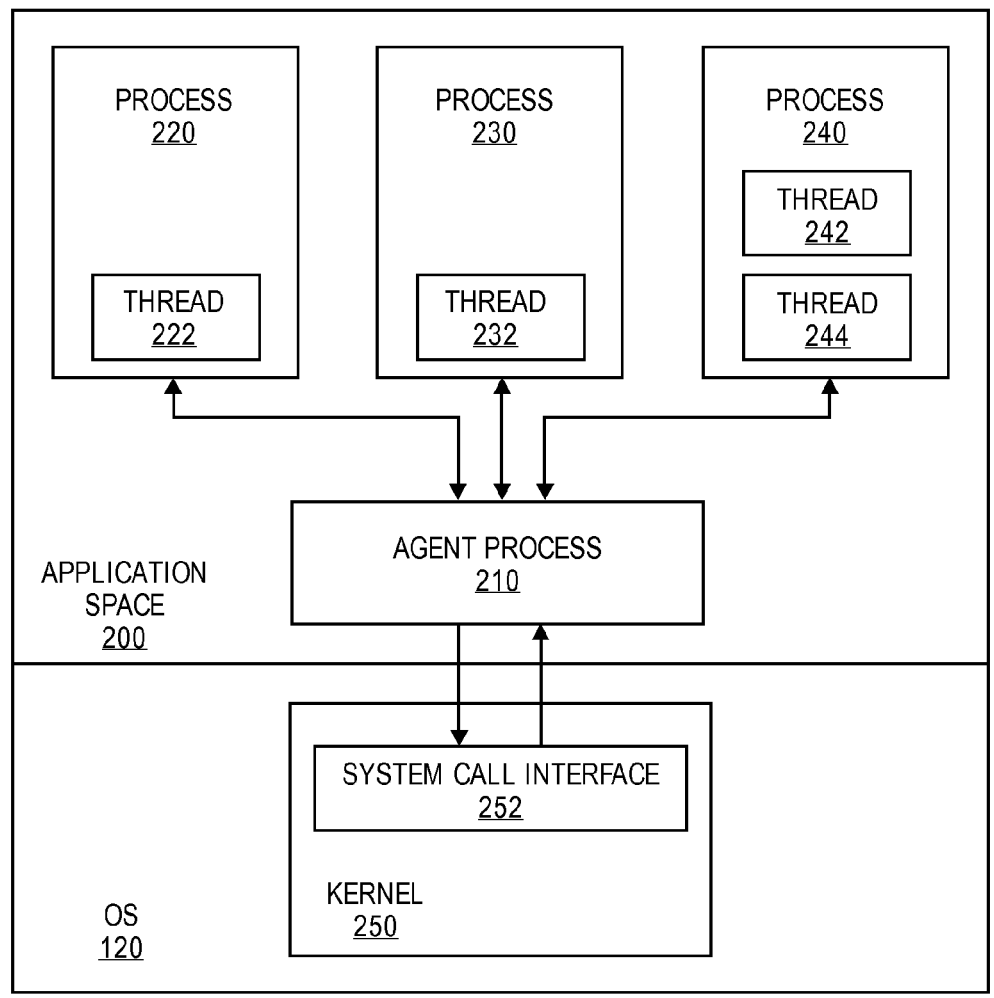
FIG. 2 illustrates an exemplary architecture for managing parallel execution of programs and processes associated with the programs, in accordance with various embodiments of the present teachings.

Reference will now be made to FIG. 2 to illustrate an exemplary embodiment for managing and coordinating parallel execution of processes in system 100 in accordance with various embodiments of the present teachings. As shown in FIG. 2, OS 120 may include a kernel 250, which serves as the core of OS 120 and may provide low-level services, such as thread management, address space management, direct memory access, inter-process communication, basic runtime libraries, and the like. Kernel 250 may directly access or reside in a kernel space (not shown) of memory 110 (as shown in FIG. 1) reserved for the use of kernel 250, device drivers supported by kernel 250, and any kernel extensions. In various embodiments, kernel 250 may initiate an agent process 210 using one of the low-level services (e.g., a thread management service) or basic runtime libraries (e.g., a runtime library for controlling thread creation), either during startup (e.g., boot-up) of system 100 or anytime prior to creating application processes in an application space 200.

In order to run applications in application space 200, OS 120 may create one or more processes (e.g., application processes 220, 230, and 240) in application space 200 to execute the instructions of the applications. In various embodiments, application space 200 is operatively coupled to OS 120 and external to kernel 250, and may have a lower level of privilege to access resources of system 100 than kernel 250. Application space 200 may be a user space provided by OS 120 and/or a runtime environment such as, for example, Java™ Runtime Environment by Sun Microsystems and Common Language Runtime by Microsoft Corporation.

Application space 200 may provide a set of software instructions that supports the execution of the applications, and may include one or more application program interfaces (not shown), or APIs. The APIs may be configured to provide a set of routines that the applications invoke to request lower-level services performed by kernel 250. For example, the processes running in application space 200 may call the API routines, which in turn rely on a system call interface 252 to instruct kernel 250 to access resources of system 100, determine and provide system and processor configuration information of system 100, and the like. In general, when one of the processes makes a system call, the calling process is suspended and kernel 250 takes over, which results in a mode transition and possibly a context switch, and can be costly in terms of performance. For example, a system call can take 10 to 1000 times more processing time than a normal processing operation, such as an inter-process communication (IPC) operation to pass messages between two or more processes. Therefore, it is desirable to reduce the number of system calls made by the processes running in application space 200.

The processes conceptually represent running instances of applications and includes variables and other state information. In general, the processes running in application space 200 are independent of each other, have separate address spaces, and may communicate with each other using well known IPC mechanisms (e.g., pipes, sockets, streams, and the like) or other communication services or mechanisms provided by OS 120. The processes may each have an associated level of priority. For example, processes associated with real-time applications or multi-media applications may be given a higher level of priority than an operating system process or a background process. The processes may communicate with each other to transfer data and/or to synchronize their operations and states. As will be described in greater detail below, the processes may also utilize IPC mechanisms or other communication mechanisms to communicate with agent process 210 running in application space 200.

Each of the processes may include one or more execution contexts (e.g., threads 222, 232, 242, and 244). An execution context relates to the operations for performing one or more tasks of its associated process. Execution contexts are also known to those skilled in the art as threads of execution, fibers, and the like. Typically, multiple threads of a single process share the same address space and other resources of system 100. During runtime, the processes may each create one or more execution contexts to perform one or more tasks. In various embodiments, the processes may consider a processor configuration, system workload, and/or resource availability of system 100 prior to creating the execution contexts to optimize performance and avoid overtaxing system 100, and thus the processes may send requests for processor configuration information and/or resource availability data.

Processor configuration information may include, for example, a number of processors (e.g., processor 102) in system 100, a communication capability between the processors, a number of cores (e.g., execution core 104) in each of the processors, an amount and type of memory (including, e.g., main memory and cache memory) available to each of the processors and associated costs for accessing the available memory (e.g., latency, bandwidth limit, and the like), a processing capability (e.g., instructions per second) of each of the processors, and a workload of the processors and other resources in system 100. Resource availability data may include, for example, a number of available execution cores (e.g., execution core 104) in system 100, an amount and type of memory accessible to the available execution cores, a number of execution contexts (e.g., threads 222, 232, 242, and 244) running in system 100, a number of new execution contexts that can be initiated to optimally utilize the available resources of system 100, and which execution cores are available for running a particular execution context based on that execution context's requirements and attributes, such as its predicted memory requirement and its relationship and inter-dependencies with other execution contexts running in system 100.

In various embodiments, agent process 210 may retrieve and centrally store system and processor configuration information and workload status of system 100, and may then intercept and respond to the processes' information requests to reduce the number of computationally expensive system calls to kernel 250. In further embodiments, agent process 210 may generate resource availability data based on the retrieved configuration information and system workload. Agent process 210 may then intercept and respond to the processes' requests for resources of system 100 to coordinate parallel execution of the processes and their associated execution contexts, by synchronizing the resource requests and allocating system resources based on the resource availability of system 100 and/or the requesting processes' level of priority. During runtime, agent process 210 obtains a system-wide view of the system requirements and resource utilization of the processes and their associated execution contexts, and thus agent process 210 may optimally coordinate the processes' resource requests with other processes running in application space 200.

As shown in FIG. 2, agent process 210 runs in application space 200 and may communicate with the processes via IPC or other communication mechanisms. By using exemplary methods as illustrated in FIGS. 3A-C and described in greater detail below, agent process 210 may make system calls to kernel 250 to retrieve system and processor configuration information as well as a workload status of system 100, generate resource availability data based on the retrieved configuration information and system workload, and/or allocate system resources in response to resource requests by processes running in application space 200.

Figure 3A:
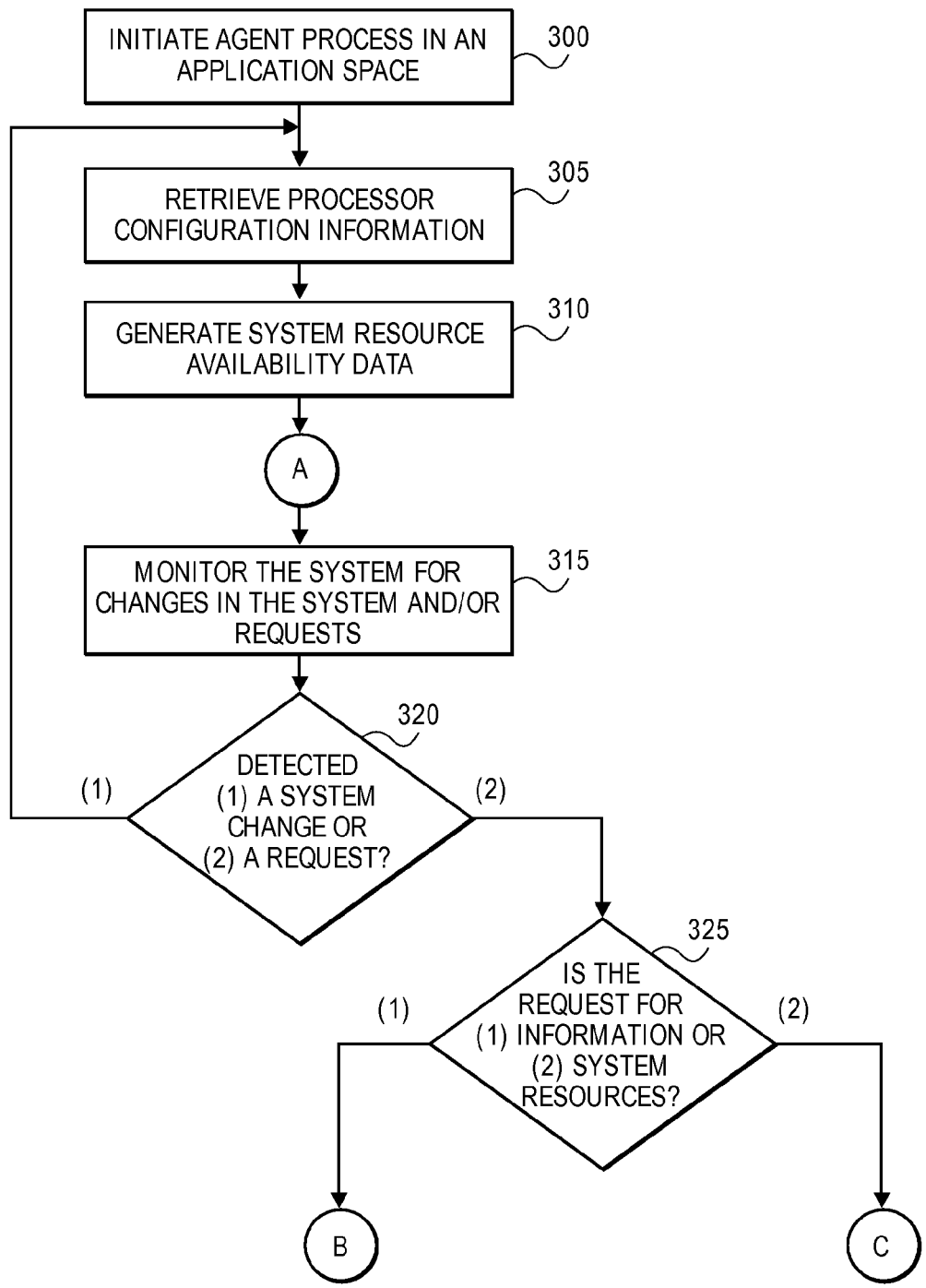
FIGS. 3A-C illustrate exemplary methods for managing and coordinating parallel execution of processes in an application space of a computer system, in accordance with various embodiments of the present teachings.
Figure 3B:
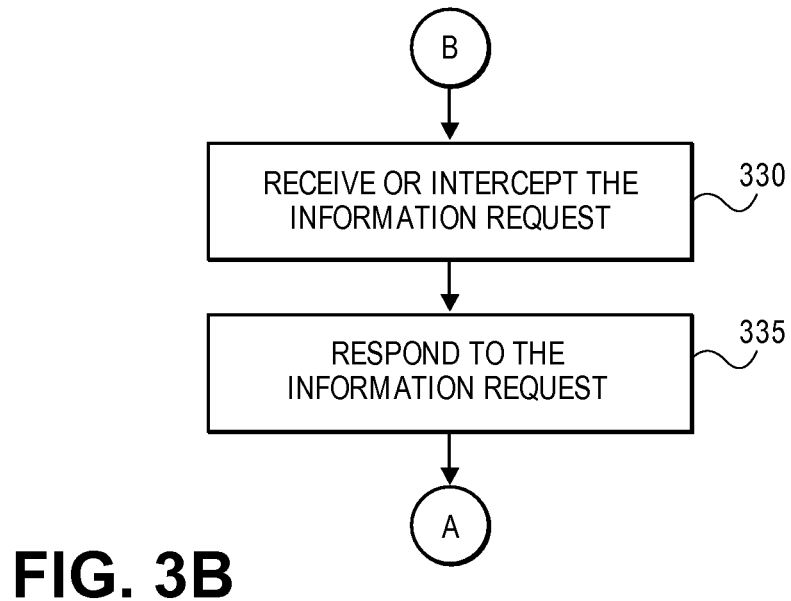
Figure 3C:
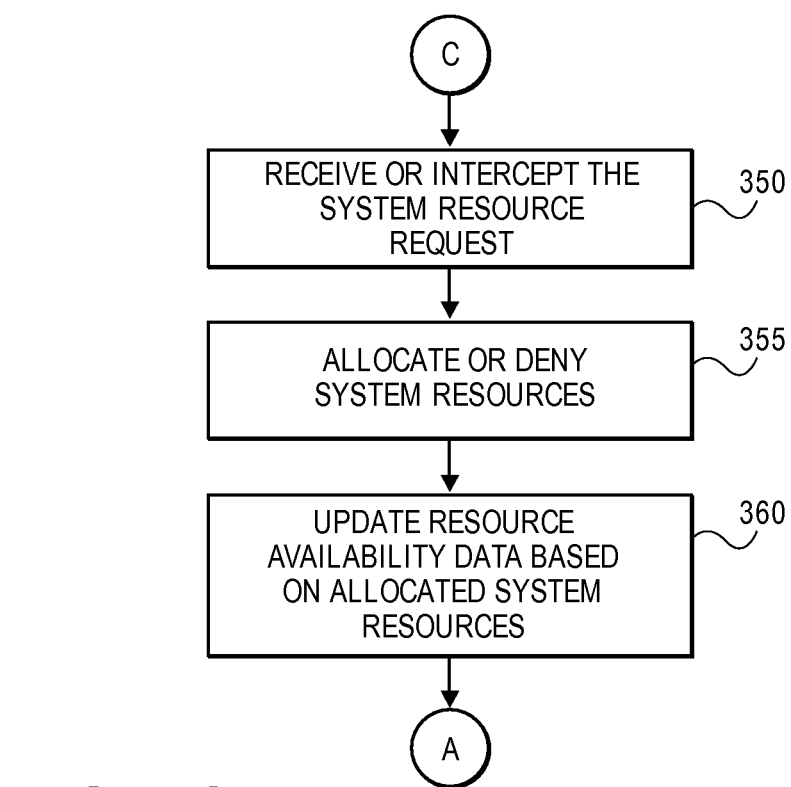

FIGS. 3A-C illustrate exemplary methods for managing and coordinating parallel execution of processes in application space 200 of system 100, in accordance with various embodiments of the present teachings. In stage 300, agent process 210 may be initiated in application space 200. In various embodiments, agent process 210 may be initiated by OS 120 during startup (e.g., boot-up) of system 100 or by a runtime environment when the runtime environment is started up. Agent process 210 may be a daemon process, a non-kernel service, or the like.

Next, in stage 305, agent process 210 may make system calls to kernel 250 to retrieve system and processor configuration information, system workload status, and/or other information of system 100. In response to the system calls, kernel 250 may provide agent process 210 with a number of processors in system 100, a communication capability between the processors, a number of cores in each of the processors, an amount and type of memory available to each of the processors and associated costs for accessing the available memory, a processing capability of each of the processors, a workload status of the processors and other resources in system 100, and the like. Other means for retrieving various types of information and/or workload status of system 100 directly from kernel 250 are known to those skilled in the art.

In stage 310, agent process 210 may generate new resource availability data or update existing resource availability data based on the retrieved processor configuration information, system workload status, and/or other information. In various embodiments, agent process 210 may determine a number of new execution contexts that can be initiated to optimally utilize the available resources of system 100 based on a number of available execution cores in system 100 and/or an amount and type of memory accessible to the available execution cores. In further embodiments, agent process 210 may also determine which execution cores are available for running a particular execution context based on that execution context's requirements and attributes, such as its predicted memory requirement and its relationship and inter-dependencies with other execution contexts running in system 100.

Next, in stage 315, agent process 210 may monitor system 100 for changes in the processor configuration and/or workload of system 100. For example, agent process 210 may periodically poll kernel 250 for any changes, or kernel 250 may notify agent process 210 of any changes. In stage 315, agent process 210 may also monitor for information and/or resource requests from processes (e.g., application processes 220, 230, and 240) running in application space 200. The requests may be transmitted using IPC mechanisms or other communication services or mechanisms provided by OS 120.

In stage 315, when agent process 210 detects changes in the processor configuration and/or workload of system 100 or a request from at least one of the processes, the method may flow to decision stage 320 to determine the next stage based on whether agent process 210 detected a system change or a request. In various embodiments, in decision stage 320, if agent process 210 has detected changes in the processor configuration and/or workload of system 100, the method may flow to stage 305 so agent process 210 may update the processor configuration information and/or system workload status. Alternatively, in decision stage 320, if agent process 210 has detected that at least one of the processes has sent a request, the method may flow to decision stage 325 to determine whether the request is a request for information or for resources of system 100. In decision stage 325, if agent process 210 determines that the request is for processor configuration and/or system workload information, the method may then flow to stage 330 as shown in FIG. 3B so agent process 210 may intercept and respond to the information request. Alternatively, if agent process 210 determines in decision stage 325 that the request is for system resources, the method may then flow to stage 350 as shown in FIG. 3C so agent process 210 may intercept and respond to the resource request.

In stage 330 (as shown in FIG. 3B), agent process 210 may receive or intercept the information request from the requesting process, and then in stage 335, agent process 210 may respond to the request by providing the requesting process with the processor configuration information and/or system workload status using, for example, IPC mechanisms and/or other communication services or mechanisms provided by OS 120. After agent process 210 responds to the information request, the method may flow back to stage 315 (as shown in FIG. 3A) so agent process 210 may continue to monitor system 100 for changes in the processor configuration or workload of system 100, and/or for information or resource requests from the processes running in application space 200.

If agent process 210 in decision stage 320 determines that the request is for system resources, then in stage 350 (as shown in FIG. 3C) agent process 210 may receive or intercept the resource request from the requesting process. In various embodiments, agent process 210 may parse or examine the resource request to determine, for example, attributes of the requesting process (e.g., level of priority, number of associated execution contexts already running in the system, and the like), the requested resource (e.g., one or more execution cores, memory, I/O devices, and the like), etc.

Next, in stage 355, agent process 210 may allocate resources or deny resource requests based on, for example, the resource availability data, attributes of the requesting process and other processes running in application space 200, system resources currently allocated to the requesting process or the other processes, and/or pending resource requests from the requesting process or the other processes. Because agent process 210 may obtain a system-wide view of the system requirements and resource utilization of the processes and their associated execution contexts running in application space 200, agent process 210 may coordinate resource allocation to the processes based on the system-wide view. For instance, if process 220 wishes to initiate a new execution context and sends a resource request for an execution core (e.g., execution core 104), agent process 210 may receive or intercept the resource request and determine if an execution core is available and whether or not another process (e.g., processes 230 or 240) with a higher level of priority is also requesting for an execution core. Agent process 210 may then assign an execution core (e.g., execution core 104) to process 220 if one is available and that there are no pending resource requests for execution cores by other processes with higher levels of priority. Agent process 210 may also assign an execution core to process 220 even if the execution core is assigned to other process or processes, if the execution core can be shared by multiple processes. Furthermore, agent process 210 may enqueue the execution core request into a request queue, and notify and/or dynamically assign an execution core to process 220 when the execution core become available while process 220 is still executing. Alternatively, if no execution cores are available for assignment or if other processes with higher levels of priority are also requesting for available execution cores, agent process 210 may deny the resource request or hold the resource request as pending until an execution core becomes available. One skilled in the art will recognize that other resource allocation schemes are possible.

Finally, in stage 360, agent process 210 may update the resource availability data based on system resources allocated, if any, to the requesting process. After agent process 210 updates the resource availability data, the method may flow back to stage 315 so agent process 210 may continue to monitor system 100 for changes in the processor configuration or workload of system 100, and/or for information or resource requests from the processes running in application space 200.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While various embodiments of the present teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. For example, although the exemplary method has been described by examples, the steps of the method may be performed in a different order than illustrated, or simultaneously. Moreover, while the exemplary method provides for an agent process that monitors for and responds to system information and resource requests, the method and the agent process may be configured to monitor for and respond to only one of system information requests or resource requests, according to various embodiments of the present teachings. Those skilled in the art will recognize that these and other variations are possible within the spirit and scope as defined in the following claims and their equivalents.

What is claimed is:

1. A method comprising:
   executing, by a processor of a computer system, an agent process that resides in an application space of the computer system and not in a kernel space of the computer system;
   obtaining from an operating system of the computer system, by the agent process, processor configuration information for a set of one or more processors comprising the processor, wherein the agent process generates resource availability data in view of the processor configuration information;
   intercepting, by the agent process, a request for the processor configuration information that is submitted to the operating system by an application process that resides in the application space of the computer system;
   providing to the application process, by the agent process, the processor configuration information;
   intercepting, by the agent process, a resource request from the application process that is submitted to the operating system; and
   allocating one or more resources to the application process in view of the resource request and the resource availability data.

2. The method of claim 1, wherein the application process initiates a thread in view of the resource availability data.

3. The method of claim 1, wherein the processor is a multi-core processor, and wherein allocating one or more resources comprises:
   assigning an execution core to the application process.

4. The method of claim 1, further comprising:
   updating the resource availability data in view of the one or more resources allocated to the application process.

5. The method of claim 1, wherein the agent process monitors for a change in the processor configuration information and updates the processor configuration information after detecting the change.

6. The method of claim 1, wherein the processor configuration information comprises at least one of a number of processors, communication capability between the processors, a number of execution cores in each of the processors, memory available to each of the processors, or a processing capability of each of the processors.

7. The method of claim 1, wherein the application space is one of a runtime environment and a user space of the operating system.

8. The method of claim 1, wherein the processor configuration information is provided via an inter-process communication protocol.

9. The method of claim 1, further comprising:
   intercepting, by the agent process, a second resource request from a second application process executing in the application space;
   determining an order of priority of the resource request and the second resource request in view of the resource availability data; and
   allocating one or more resources to the application process and one or more resources to the second application process in view of the order of priority.

10. The method of claim 1, wherein the resource availability data comprises at least one of a number of new execution contexts that can be initiated, available execution cores for running an execution context, an amount and type of memory accessible to the available execution cores, or a number of execution contexts running in the application space.

11. A computer system comprising:
a memory to store an application space and a kernel space; and
a processor, operatively coupled to the memory, to:
- execute an operating system that resides in the kernel space,
- execute an agent process that resides in the application space and not in the kernel space,
- obtain from the operating system, via the agent process, processor configuration information for a set of one or more processors comprising the processor, wherein the agent process generates resource availability data in view of the processor configuration information,
- intercept, by the agent process, a request for the processor configuration information that is submitted to the operating system by a first application process executing in the application space,
- provide, via the agent process, the processor configuration information to the first application process,
- intercept, by the agent process, a resource request from a second application process that is submitted to the operating system, and
- allocate one or more resources to the second application process in view of the resource request and the resource availability data.

12. The computer system of claim 11, wherein the first application process initiates an execution context in view of the resource availability data.

13. The computer system of claim 11, wherein the processor is also to:
assign one of a plurality of execution cores of the set of one or more processors to the second application process in view of the resource request and the resource availability data.

14. The computer system of claim 11, wherein the application space is one of a runtime environment and a user space of the operating system.

15. The method of claim 1, further comprising:
obtaining from an operating system of the computer system, by the agent process, a system workload; and
generating, by the agent process, resource availability data in view of the processor configuration information and the system workload.

16. A non-transitory computer readable storage medium comprising instructions to cause a processor to:
- execute an operating system that resides in a kernel space;
- execute, by the processor, an agent process that resides in an application space and not in the kernel space;
- obtain from the operating system, via the agent process, processor configuration information for a set of one or more processors comprising the processor, wherein the agent process generates resource availability data in view of the processor configuration information;
- intercept, by the agent process, a request for the processor configuration information that is submitted to the operating system by a first application process executing in the application space;
- provide, via the agent process, the processor configuration information to the first application process;
- intercept, by the agent process, a resource request from a second application process that is submitted to the operating system; and
- allocate one or more resources to the second application process in view of the resource request and the resource availability data.

17. The non-transitory computer readable storage medium of claim 16, wherein the application space is one of a runtime environment and a user space of the operating system.

18. The non-transitory computer readable storage medium of claim 16, wherein the second application process initiates a thread in view of the resource availability data.

19. The non-transitory computer readable storage medium of claim 16, wherein the processor is a multi-core processor, and wherein allocate one or more resources comprises:
assign an execution core to the second application process.

20. The non-transitory computer readable storage medium of claim 16, wherein the processor configuration information comprises at least one of a number of processors, communication capability between the processors, a number of execution cores in each of the processors, memory available to each of the processors, or a processing capability of each of the processors.

* * * * *